United States Patent Office 3,787,410
Patented Jan. 22, 1974

3,787,410
CARBOXYAMIDO SUBSTITUTED-2-ALKYLTHIO-5-PYRIMIDINESULFONAMIDES
Paul L. Anderson, Dover, and Robert E. Manning, Mountain Lakes, N.J., assignors to Sandoz-Wander, Inc., Hanover, N.J.
No Drawing. Filed Dec. 2, 1971, Ser. No. 204,296
Int. Cl. C07d 51/40, 51/42
U.S. Cl. 260—256.5 R
1 Claim

ABSTRACT OF THE DISCLOSURE

Carboxyamido substituted-2-alkylthio - 5 - pyrimidinesulfonamides, e.g., 4,6 - di - (p-chlorobenzoylamido)-2-methylthio-5-pyrimidinesulfonamide, are prepared by condensing 4,6-diamino-2-alkylthio-5-pyrimidinesulfonamides with benzoic or substituted benzoic acids or acid halides and are useful as anti-inflammatories.

This invention relates to carboxyamido derivatives of 4,6-diamino-2-alkylthio - 5 - pyrimidinesulfonamides. In particular, it relates to 6-amino-4-benzoylamido and 4,6-di-benzoylamido substituted-2-alkylthio-5-pyrimidine-sulfonamides, processes for their preparation, and their use in pharmaceutical compositions.

The compounds of this invention may be represented by the following structural formula:

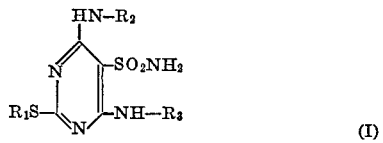

where $R_1$ is lower alkyl, i.e. alkyl having 1 to 4 carbon atoms, e.g., methyl, ethyl, isopropyl and the like, and
$R_2$ and $R_3$ each independently represent hydrogen or

where $n$ is 1 or 2 and
$R_4$ independently represents hydrogen, halo having an atomic weight of about 19 to 36 or nitro provided at least one of $R_2$ or $R_3$ is other than hydrogen and pharmaceutically acceptable acid addition salts thereof.

The compounds of Formula I may be prepared in accordance with the following reaction scheme:

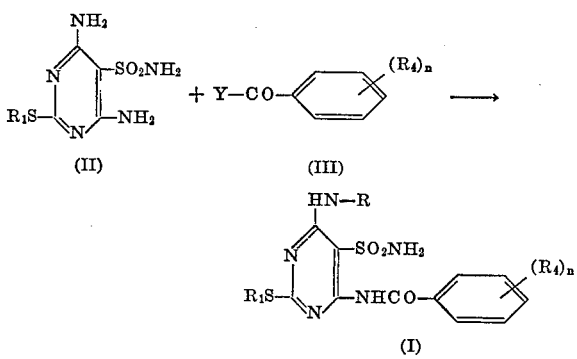

where

Y is hydroxy or halo having an atomic weight of about 35 to 80; and
$R_1$, $R_2$ and $R_4$ are as defined previously The compounds of Formula I are prepared by acylating a compound of Formula II with a compound of Formula III in an inert solvent. When the amount of Compound III present in the reaction mixture is limited, the compound of Formula I in which $R_2$ is hydrogen, is preferentially formed. Excess reagent (III) in the reaction results in disubstitution at both the 4 and 6 amino positions of Compound II. The acylation can be carried out using the acid chloride or acid bromide form of Compound III or by using the acid form of Compound III in conjunction with oxalyl chloride or oxalyl bromide. The inert solvent is preferably aromatic hydrocarbons, ethers or excess reactant III when liquid and where disubstitution is desired. Although the temperature is not critical, the reaction is normally carried out at a temperature of 20° to 50° C., preferably 20° to 30° C. The time is not critical, but the reaction should be run for about 1 to 6 days for optimum results. The product is recovered by conventional techniques, e.g., evaporation and recrystallization or chromatography.

Many of the compounds of Formulas II, and III are known and may be prepared by processes disclosed in the literature. The compounds of Formulas II, and III are specifically disclosed may be prepared by analogous methods from known starting materials.

The compounds of Formula I are useful because they possess pharmacological activity in animals. In particular, the compounds of Formula I are useful as anti-inflammatory agents, as indicated by their activity in rats using the acute carrageenan-induced edema procedure substantially as described by Winter (Proc. Soc. Exptl. Biol., 111: 544, 1962) or by their activity in male Sprague-Dowley rats tested substantially in accordance with the procedure described by Perrine, J. W. and Takesue, E. I. (Arch. Int. Pharmacodyn., 174: 192, 1968).

For such use, the compounds may be admixed with conventional pharmaceutical carriers or diluents and administered internally (orally or parenterally) in the form of tablets, capsules, elixirs, solutions, or suspensions. Furthermore, the compounds of Formula I may also be administered in the form of their non-toxic pharmaceutically acceptable acid addition salts.

Such salts possess the same order of activity as the free base, are readily prepared by reacting the base with an appropriate acid and, accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate and the like.

For the above-mentioned use, the dosage administered will, of course, vary depending upon the compound employed, mode of administration and treatment desired. However, in general, satisfactory results are obtained when the compound is administered at a daily dosage of from about 0.3 milligram per kilogram of body weight to about 200 milligrams per kilogram of body weight, preferably given in divided doses 2 to 4 times a day or in sustained release form. For the larger mammals as well as the smaller domestic mammals, total daily dosage is generally from about 20 milligrams to about 1000 milligrams, and dosage forms suitable for internal administration comprise from about 5 milligrams to about 500 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may conatin the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, acid and talc. The tablets may be uncoated or coated by known techniques to delay disintegration and absorption in the gastro-intestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

TABLETS AND CAPSULES SUITABLE FOR ORAL ADMINISTRATION

Tablets and capsules containing the ingredients indicated below may be prepared by conventional techniques and are useful in treating inflammation at a dose of one tablet or capsule 2 to 4 times a day.

| Ingredient | Weight (mg.) Tablet | Capsule |
|---|---|---|
| 4,6-di-(p-chlorobenzoylamido)-2-methylthio-5-pyrimidinesulfonamide | 50 | 50 |
| Tragacanth | 10 | |
| Lactose | 197.5 | 250 |
| Corn starch | 25 | |
| Talcum | 15 | |
| Magnesium stearate | 2.5 | |
| Total | 300 | 300 |

STERILE SUSPENSION FOR INJECTION AND ORAL LIQUID SUSPENSION

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitably administered 2 to 4 times per day for this purpose.

| Ingredients | Weight (mg.) Sterile injectable suspension | Oral liquid suspension |
|---|---|---|
| 4,6-di-(p-chlorobenzolamido)-2-methyl-thio-5-pyrimidinesulfonamide | 50 | 50 |
| Sodium carboxy methyl cellulose USP | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, USP | | 4.5 |
| Propyl paraben, USP | | 1.0 |
| Polysorbate 80 (e.g. Tween 80), USP | | 5 |
| Sorbitol solution, 70% USP | | 2,500 |
| Buffer agent to adjust pH for desired stability | q.s | q.s. |
| Water | (¹) | (²) |

¹ For injection q.s. to 1 ml.
² Q.s. to 5 ml.

EXAMPLE 1

6-amino-4-benzoylamido-2-methylthio-5-pyrimidinesulfonamide

To 2.0 g. of 4,6-diamino-2-methylthio-5-pyrimidinesulfonamide dissolved in 5.0 ml. of tetrahydrofuran is added dropwise 1.4 g. of benzoyl chloride. The mixture is stirred while refluxing for 1 day following which ether is added to precipitate crystals which are then filtered. The residue is washed with 100 milliliters of methanol and 20 milliliters of ether to yield the title product.

Following the above procedure but usinng an equivalent amount of p-chlorobenzoyl chloride or p-nitrobenzoyl chloride in place of the benzoyl chloride, there is obtained 6 - amino - 4 - (p-chlorobenzoylamido)-2-methylthio-5-pyrimidinesulfonamide or 6 - amino - 4-(p-nitrobenzoylamido) - 2 - methylthio - 5 - pyrimidinesulfonamide respectively.

EXAMPLE 2

4,6-di-(p-chlorobenzoylamido)-2-methylthio-5-pyrimidinesulfonamide

To 19.5 g. of oxalyl chloride is added slowly at room temperature 40 g. of p-chlorobenzoic acid. The solution is stirred at room temperature for 15 minutes and then at 100° for 30 minutes. To this mixture is added 5.0 g. of finely powdered 4,6 - diamino-2-methylthio-5-pyrimidinesulfonamide. The reactants are heated at 100° for 1.5 hours, at 120° for 3 hours and at 130° for 9 hours. The mixture is then cooled to room temperature and the crystals filtered and washed with ether. Recrystallization from methanol-ether yields the title product (M.P. 304°–306° C.).

When the above process is carried out and an equivalent amount of benzoic acid or p-nitrobenzoic acid is used in place of the p-chlorobenzoic acid, there is obtained 4,6-dibenzoylamido-2-methylthio-5-pyrimidinesulfonamide or 4,6 - di - (p-nitrobenzoylamido)-2-methylthio-5-pyrimidinesulfonamide respectively.

What is claimed is:
1. A compound of the formula

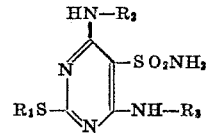

where
$R_1$ is lower alkyl and
$R_2$ and $R_3$ each independently represent hydrogen or

where
$n$ is 1 or 2 and
each $R_4$ independently represents hydrogen, fluorine, chlorine or nitro provided at least one of $R_2$ or $R_3$ is other than hydrogen and pharmaceutically acceptable acid addition salts thereof.

References Cited

Wagner et al. Synthetic Organic Chemistry, New York, John Wiley & Sons, 1953, p. 566.

RICHARD J. GALLAGHER, Primary Examiner

U.S. Cl. X.R.

424—80, 200, 251